United States Patent
Cho et al.

(10) Patent No.: US 10,196,968 B2
(45) Date of Patent: Feb. 5, 2019

(54) BOOSTING CONTROL METHOD OF ENGINE FOR CDA

(71) Applicant: HYUNDAI MOTOR COMPANY, Seoul (KR)

(72) Inventors: Hyo Sang Cho, Suwon-si (KR); Jung Sub Lee, Yongin-si (KR); Seung Eun Yu, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 142 days.

(21) Appl. No.: 15/257,300

(22) Filed: Sep. 6, 2016

(65) Prior Publication Data
US 2017/0292440 A1 Oct. 12, 2017

(30) Foreign Application Priority Data
Apr. 11, 2016 (KR) .................. 10-2016-0043892

(51) Int. Cl.
*F02B 33/44* (2006.01)
*F02B 37/16* (2006.01)
(Continued)

(52) U.S. Cl.
CPC .............. *F02B 37/16* (2013.01); *F02B 33/44* (2013.01); *F02D 17/02* (2013.01); *F02D 23/00* (2013.01);
(Continued)

(58) Field of Classification Search
CPC .... F02B 37/16; F02B 33/44; F02B 2037/162; F02D 23/00; F02D 17/02; Y02T 10/144
(Continued)

(56) References Cited

U.S. PATENT DOCUMENTS 9,920,697 B2 * 3/2018 Pochner ................. F02D 9/02
2012/0318235 A1* 12/2012 Kaiser ................. F02D 11/105
123/350
(Continued)

FOREIGN PATENT DOCUMENTS

JP 2013-57289 A 3/2013
JP 2013057289 A * 3/2013 .............. F02B 37/04
(Continued)

OTHER PUBLICATIONS

Korean Office Action dated Jun. 19, 2017 form the corresponding Korean Application No. 10-2016-0043892, 5 pp.

*Primary Examiner* — J. Todd Newton
(74) *Attorney, Agent, or Firm* — Brinks Gilson & Lione

(57) ABSTRACT

The present disclosure provides a boosting control method of an engine for cylinder de-activation (CDA). The method includes: a CDA operable area confirming step of determining, by a controller based on a driving state of the engine, whether the CDA is in an operable area after the engine starts; an actual boosting deriving step of deriving a total target boosting from the controller and calculating the desired actual boosting; a supercharger operable area confirming step of determining, by the controller, whether the supercharger is in the operable area; a supercharger target rotation speed deriving step of deriving, by the controller, a target rotation speed of the supercharger; and a supercharger passage opening step of closing a bypass valve to open a supercharger passage.

12 Claims, 3 Drawing Sheets

(51) Int. Cl.
  *F02D 17/02* (2006.01)
  *F02D 23/00* (2006.01)

(52) U.S. Cl.
  CPC ....... *F02B 2037/162* (2013.01); *Y02T 10/144* (2013.01)

(58) Field of Classification Search
  USPC ........................................................ 60/605.1
  See application file for complete search history.

(56) References Cited

U.S. PATENT DOCUMENTS

| | | | | |
|---|---|---|---|---|
| 2014/0278009 A1* | 9/2014 | Cowgill | ............. | F02D 13/0219 |
| | | | | 701/105 |
| 2014/0311446 A1* | 10/2014 | Whitney | ............. | F02D 41/0002 |
| | | | | 123/344 |
| 2014/0316681 A1* | 10/2014 | Whitney | ................ | F02D 41/22 |
| | | | | 701/108 |
| 2014/0316682 A1* | 10/2014 | Whitney | ............... | F02D 11/105 |
| | | | | 701/108 |
| 2015/0159544 A1* | 6/2015 | Cowgill | ................ | F02B 37/002 |
| | | | | 60/602 |
| 2015/0159545 A1* | 6/2015 | Cowgill | ................ | F02B 37/002 |
| | | | | 60/602 |
| 2015/0275771 A1* | 10/2015 | Pochner | .................... | F02D 9/02 |
| | | | | 701/103 |
| 2015/0292396 A1* | 10/2015 | Gady | .................. | F02D 41/0007 |
| | | | | 60/611 |
| 2016/0363063 A1* | 12/2016 | Pochner | .............. | F02D 41/0002 |

FOREIGN PATENT DOCUMENTS

| | | | | |
|---|---|---|---|---|
| KR | 10-1998-0048074 | | 9/1998 | |
| KR | 10-1998-0051110 | | 9/1998 | |
| KR | 10-2011-0060983 | | 6/2011 | |
| KR | 20110060983 A | * | 6/2011 | ............. B60T 17/18 |

\* cited by examiner

BOOSTING CONTROL METHOD OF ENGINE FOR CDA

CROSS REFERENCE TO RELATED APPLICATION

The present application claims priority to and the benefit of Korean Patent Application No. 10-2016-0043892, filed on Apr. 11, 2016, which is incorporated herein by reference in its entirety.

FIELD

The present disclosure relates to a boosting control method of an engine for cylinder de-activation (CDA) for controlling the boosting supplied to an engine.

BACKGROUND

The statements in this section merely provide background information related to the present disclosure and may not constitute prior art.

A diesel engine uses an engine system to which a turbocharger is applied or both of a supercharger and the turbocharger are applied to increase a boosting rate of intake air. In particular, an electric supercharger with a driving force of a motor, not a driving force of an engine, may be applied. Generally, a compressor of the electric supercharger has an inverse proportion relationship between a flow and a compression rate, such that the compression rate may be low in a high flow band and the compression rate may be high in a low flow band. That is, the supercharger may be operated as only a flow resistor at the place where it is out of an operating area.

Further, the turbocharger may have a deteriorating emission (EM), deteriorating fuel efficiency, or the like due to an inefficient turbo operating area caused by a chronic turbo lag problem and a matching problem of a size of the turbocharger.

The contents described as the related art have been provided only for assisting in the understanding for the background of the present disclosure and should not be considered as corresponding to the related art known to those skilled in the art.

SUMMARY

The present disclosure provides a boosting control method of an engine for CDA capable of increasing efficiency of an engine system by appropriately controlling a supercharger.

According to one form of the present disclosure, a boosting control method of an engine for cylinder de-activation (CDA) includes: a CDA operable area confirming step of determining, by a controller based on a driving state of the engine, whether the CDA is in an operable area after the engine starts; an actual boosting deriving step of deriving a total target boosting from the controller and calculating a desired actual boosting when the CDA operable area confirming step determines that the CDA is in the operable area; a supercharger operable area confirming step of determining, by the controller, whether a supercharger is in the operable area; a supercharger target rotation speed deriving step of deriving, by the controller, a target rotation speed of the supercharger, when the supercharger operable area confirming step determines that the supercharger is in the operable area; and a supercharger passage opening step of closing a bypass valve to open a supercharger passage when the target rotation speed of the supercharger derived in the supercharger target rotation speed deriving step is equal to or more than a predetermined reference value previously input to the controller.

In the CDA operable area confirming step, if the driving state of the engine determines that the CDA is in an inoperable area, the bypass valve may be opened to close the supercharger passage.

In the actual boosting deriving step, the controller may derive the total target boosting based on an RPM of the engine and a fuel amount supplied to the engine.

In the actual boosting deriving step, a result value obtained by subtracting current boosting from the total target boosting derived by the controller may be set as an actual boosting.

In the supercharger operable area confirming step, the controller may determine a current state of the supercharger based on an air flow within the supercharger and a maximum speed value of the supercharger.

In the supercharger operable area confirming step, if it is determined that the supercharger is in the inoperable area, the bypass valve may be opened to close the supercharger passage.

In the supercharger target rotation speed deriving step, it is determined whether the desired actual boosting is equal to or more than the reference value previously input to the controller and if it is determined that the desired actual boosting is equal to or more than the reference value, the controller may derive the target rotation speed of the supercharger.

The supercharger target rotation speed deriving step determines whether the desired actual boosting is equal to or more than a reference value previously input to the controller, and if it is determined that the desired actual boosting is less than the reference value, the bypass valve may be opened to close the supercharger passage.

In the supercharger target rotation speed deriving step, the target rotation speed of the supercharger may be derived based on the desired actual boosting, a pressure of an inlet side of the supercharger, and the flow of the supercharger.

If the target rotation speed of the supercharger derived in the supercharger target rotation speed deriving step is less than the predetermined reference value previously input to the controller, the bypass valve may be opened to close the supercharger passage.

The boosting control method may further include: a supercharger driving step of driving the supercharger based on the target rotation speed of the supercharger derived in the supercharger target rotation speed deriving step after the performing of the supercharger passage opening step After the performing of the supercharger passage opening step, the CDA operable area confirming step may be repeatedly performed.

According to another form of the present disclosure, there is provided a system of an engine for CDA. The system includes: a turbocharger provided at an exhaust side of the engine provided to operate the CDA; a supercharger connected to a compressor of the turbocharger; a supercharger passage connected to the supercharger and configured to selectively bypass air supplied from an air cleaner using a bypass valve; and a controller configured to calculate target boosting depending on the state of the engine and to derive a target rotation speed of the supercharger if it is determined that the supercharger is in the operable area.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
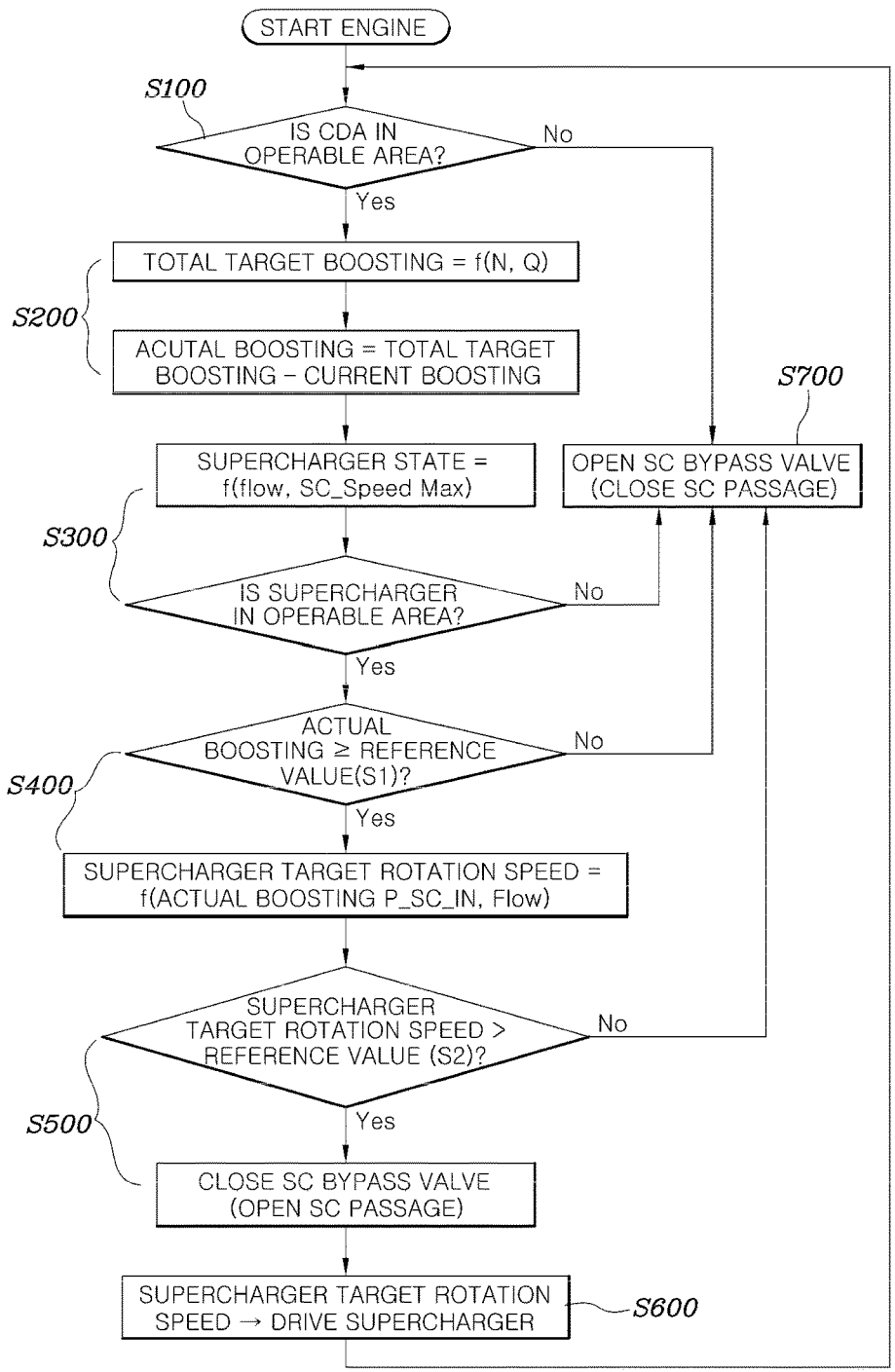
FIG. 1 is a flow chart illustrating a boosting control method of an engine for CDA according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a boosting control method of an engine for cylinder de-activation (CDA) according to one form of the present disclosure will be described with reference to the accompanying drawings.

Figure 2:
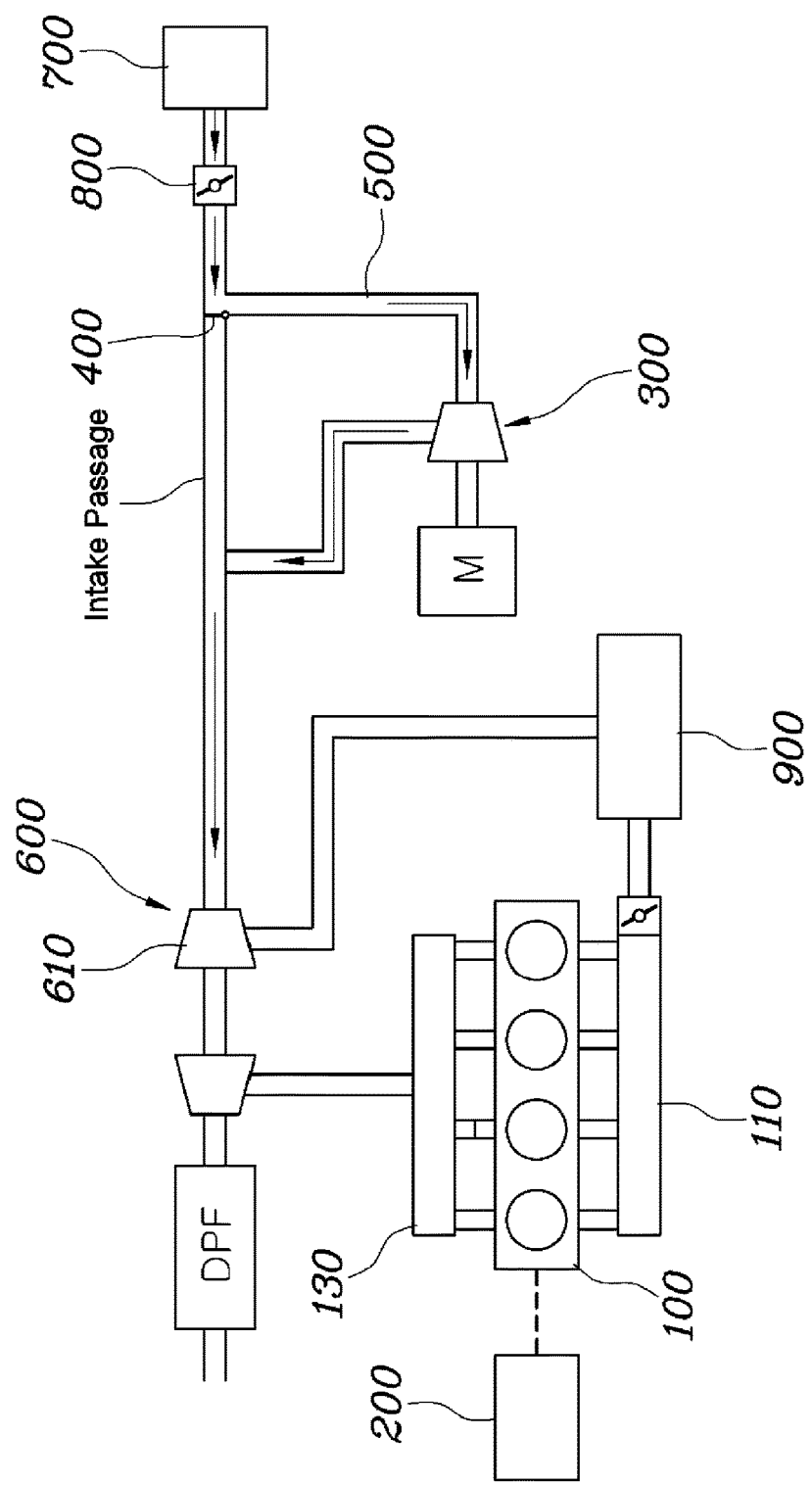
FIG. 2 is a diagram illustrating a state in which a supercharger passage illustrated in FIG. 1 is opened.
Figure 3:
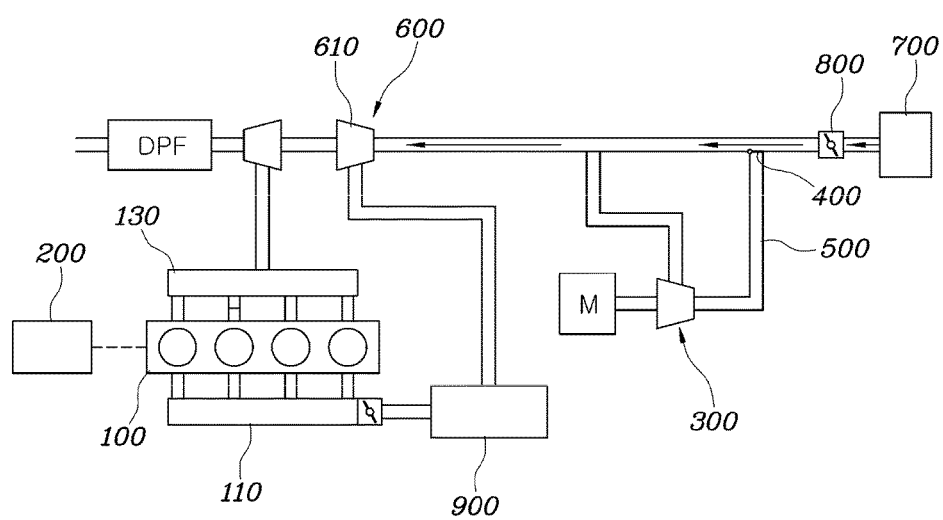
FIG. 3 is a diagram illustrating a state in which the supercharger passage illustrated in FIG. 1 is closed.

FIG. 1 is a flow chart illustrating a boosting control method of an engine for CDA, FIG. 2 is a diagram illustrating a state in which a supercharger passage 500 illustrated in FIG. 1 is opened, and FIG. 3 is a diagram illustrating a state in which the supercharger passage 500 illustrated in FIG. 1 is closed. The case to which the boosting control method of an engine for CDA is applied, in particular, a diesel engine among engines 100 for CDA in which a supercharger 300 and a turbocharger 600 are provided will be illustrated and described.

In particular, as illustrated in FIGS. 2 and 3, the boosting control method of an engine for CDA is applied to a system of an engine for CDA which includes: a turbocharger 600 provided at an exhaust side 130 of the engine 100 to operate the CDA; a supercharger 300 connected to a compressor 610 of the turbocharger 600; a supercharger passage 500 connected to the supercharger 300 and configured to selectively bypass air supplied from an air cleaner 700 using a bypass valve 400; and a controller 200 configured to calculate a target boosting depending on the state of the engine 100 and to derive a target rotation speed of the supercharger 300 if it is determined that the supercharger 300 is in the operable area.

The boosting control method of an engine for CDA includes: a CDA operable area confirming step (S100) of determining, by an controller 200 based on a driving state of the engine, whether the CDA is in an operable area after the engine 100 starts; an actual boosting deriving step (S200) in which when the CDA operable area confirming step (S100) determines that the CDA is in the operable area, the actual boosting deriving step (S200) derives a total target boosting from the controller 200 and calculates the desired actual boosting; a supercharger operable area confirming step (S300) of determining, by the controller 200, whether the supercharger 300 is in the operable area; a supercharger target rotation speed deriving step (S400) in which when the supercharger operable area confirming step (S300) determines that the supercharger 300 is in the operable area, the supercharger target rotation speed deriving step (S400) derives, by the controller 200, the target rotation speed of the supercharger 300; and a supercharger passage opening step (S500) in which when the target rotation speed of the supercharger 300 derived in the supercharger target rotation speed deriving step (S400) is equal to or more than a predetermined reference value previously input to the controller 200, the supercharger passage opening step (S500) closes the bypass valve 400 to open the supercharger passage 500.

If the engine 100 starts, the controller 200 performs the CDA operable area confirming step (S100) of determining, based on the driving state of the engine 100, whether the CDA is in the operable area. In the CDA operable area confirming step (S100), if the operation state of the engine 100 determines that the CDA is in an inoperable area, the bypass valve 400 is opened to close the supercharger passage 500 (S700). Therefore, the air sucked through the air cleaner 700 is compressed by the compressor 610 of the turbocharger 600 without passing through the supercharger 300 and then passes through an intercooler 900 to be supplied to the intake side 110 of the engine 100.

In the CDA operable area confirming step (S100), if it is determined that the CDA is in the operable area, the controller 200 performs the actual boosting deriving step (S200) of deriving the total target boosting and calculating the desired actual boosting. In the actual boosting deriving step (S200), the controller 200 may derive the total target boosting based on an RPM "N" of the engine 100 and a fuel amount "Q" supplied to the engine 100. Further, in the actual boosting deriving step (S200), a result value obtained by subtracting current boosting from the total target boosting derived by the controller 200 is set as the actual boosting.

Further, the controller 200 performs the supercharger operable area confirming step (S300) of determining whether the supercharger 300 is in the operable area. In the supercharger operable area confirming step (S300), the controller 200 determines the current state of the supercharger 300 based on an air flow within the supercharger 300 and a maximum speed value SC_SpeedMax of the supercharger 300.

In the supercharger operable area confirming step (300), if it is determined that the supercharger 300 is in the inoperable area, the bypass valve 400 is opened to close the supercharger passage 500 (S700). Therefore, the air sucked through the air cleaner 700 is compressed by the compressor 610 of the turbocharger 600 without passing through the supercharger 300 and then passes through the intercooler 900 to be supplied to the intake side 110 of the engine 100.

On the contrary, in the supercharger operable area confirming step (S300), if it is determined that the supercharger 300 is in the operable area, the controller 200 performs the supercharger target rotation speed deriving step (S400) of deriving the target rotation speed of the supercharger 300.

In the supercharger target rotation speed deriving step (S400), first, the controller 200 determines whether the derived actual boosting is equal to or more than a reference value S1 previously input to the controller 200. If it is determines that the derived actual boosting is less than the reference value S1, the bypass valve 400 is opened to close the supercharger passage 500 (S700). Therefore, the air sucked through the air cleaner 700 is compressed by the compressor 610 of the turbocharger 600 without passing through the supercharger 300 and then passes through the intercooler 900 to be supplied to the intake side 110 of the engine 100.

On the contrary, when the supercharger target rotation speed deriving step (S400) determines that the actual boosting is equal to or more than the reference value S1, the controller 200 derives the target rotation speed of the supercharger 300. The target rotation speed of the supercharger 300 may be derived based on the actual boosting, a pressure P_SC_IN of an inlet side of the supercharger 300, and the air flow of the supercharger 300.

Even in this case, if the target rotation speed of the supercharger 300 derived in the supercharger target rotation speed deriving step (S400) is less than a predetermined reference value S2 previously input to the controller 200, the bypass valve 400 is opened to close the supercharger passage 500 (S700). Therefore, the air sucked through the air cleaner 700 is compressed by the compressor 610 of the turbocharger 600 without passing through the supercharger 300 and then passes through the intercooler 900 to be supplied to the intake side 110 of the engine 100.

On the contrary, if the target rotation speed of the supercharger 300 derived in the supercharger target rotation speed deriving step (S400) is equal to or more than the predetermined reference value S2 previously input to the controller 200, the supercharger passage opening step (S500) of closing the bypass valve 400 to open the supercharger passage 500 is performed. Further, the boosting control method of an engine for CDA further includes a supercharger driving step (S600) of driving the supercharger 300 based on the target rotation speed of the supercharger 300 derived in the supercharger target rotation speed deriving step (S400) after the performing of the supercharger passage opening step (S500). Therefore, after the air sucked through the air cleaner 700 passes through an LP-EGR valve 800, the air passing through the supercharger passage 500 is compressed by the supercharger 300, the air is again compressed by the compressor 610 of the turbocharger 600 and by the intercooler 900 before the air is supplied to the intake side 110 of the engine 100. Here, the supercharger 300 may be an electric supercharger. After the performing of the supercharger passage opening step (S500), the CDA operable area confirming step (S100) is repeatedly performed.

According to a boosting control method of an engine for CDA in accordance with one form of the present disclosure as described above, it is possible to inhibit or prevent the deterioration in the exhaust gases such as smoke, carbon monoxide (CO), and hydrocarbon (THC) which are generated due to an insufficient boosting pressure caused by the insufficient flow of exhaust gas at the same vane opening of the turbocharger when the CDA is operated in the low load area of the engine. Further, it is possible to avoid the deterioration in fuel efficiency caused by closing the vane of the turbocharger to secure the boosting pressure in the insufficient boosting pressure situation caused by the insufficient flow of exhaust gas when the CDA is operated in the high load area of the engine.

That is, according to the present disclosure, it is possible to reduce pollutants within the exhaust gas and improve the fuel efficiency by increasing the boosting pressure via the supercharger supplementing insufficient boosting pressure provided by driving of the turbocharger in the area in which the driving of the supercharger is possible.

According to a boosting control method of an engine for CDA having the foregoing structure, it is possible to inhibit or prevent the deterioration in the exhaust gases such as smoke, carbon monoxide (CO), and hydrocarbon (THC) which are generated due to an insufficient boosting pressure caused by the insufficient flow of exhaust gas at the same vane opening of the turbocharger when the CDA is operated in the low load area of the engine. Further, it is possible to avoid the deterioration in fuel efficiency caused by closing the vane of the turbocharger to secure the boosting pressure due to the insufficient boosting pressure caused by the insufficient flow of exhaust gas when the CDA is operated in the high load area of the engine.

Although the present disclosure has been shown and described with respect to specific forms, it will be obvious to those skilled in the art that the present disclosure may be variously modified and altered without departing from the spirit and scope of the present disclosure.

What is claimed is:

1. A boosting control method of an engine for cylinder de-activation (CDA), the boosting method comprising:
   a CDA operable area confirming step of determining, by a controller and based on a driving state of the engine, whether the CDA is in an operable area of the CDA after the engine starts;
   an actual boosting deriving step of deriving a total target boosting from the controller and calculating an actual boosting by subtracting a current boosting from the total target boosting derived by the controller when the CDA operable area confirming step determines that the CDA is in the operable area of the CDA;
   a supercharger operable area confirming step of determining, by the controller, whether a supercharger is in an operable area of the supercharger;
   a supercharger target rotation speed deriving step of deriving, by the controller, a target rotation speed of the supercharger, when the supercharger operable area confirming step determines that the supercharger is in the operable area of the supercharger; and
   a supercharger passage opening step of opening a supercharger passage by a bypass valve when the target rotation speed of the supercharger derived in the supercharger target rotation speed deriving step is equal to or more than a predetermined reference value previously input to the controller,
   wherein when the CDA operable area confirming step determines that the CDA is not in the operable area of the CDA, the bypass valve closes the supercharger passage.

2. The boosting control method of claim 1, wherein in the actual boosting deriving step, the controller derives the total target boosting based on an RPM of the engine and a fuel amount supplied to the engine.

3. The boosting control method of claim 1, wherein in the actual boosting deriving step, a result value obtained by subtracting a current boosting from the total target boosting derived by the controller is set as an actual boosting.

4. The boosting control method of claim 1, wherein in the supercharger operable area confirming step, the controller confirms a current state of the supercharger based on an air flow within the supercharger and a maximum speed value of the supercharger.

5. The boosting control method of claim 1, wherein when the supercharger operable area confirming step determines that the supercharger is not in the operable area of the supercharger, the bypass valve closes the supercharger passage.

6. The boosting control method of claim 1, wherein the supercharger target rotation speed deriving step determines whether the actual boosting is equal to or more than a reference value previously input to the controller, and when the actual boosting is equal to or more than the reference value, the controller derives the target rotation speed of the supercharger.

7. The boosting control method of claim 1, wherein the supercharger target rotation speed deriving step determines whether the actual boosting is equal to or more than a reference value previously input to the controller, and when the actual boosting is less than the reference value, the bypass valve closes the supercharger passage.

8. The boosting control method of claim 1, wherein in the supercharger target rotation speed deriving step, the target rotation speed of the supercharger is derived based on the actual boosting, a pressure of an inlet side of the supercharger, and a flow of the supercharger.

9. The boosting control method of claim 1, wherein when the target rotation speed of the supercharger is less than the predetermined reference value previously input to the controller, the bypass valve closes the supercharger passage.

10. The boosting control method of claim 1, further comprising a supercharger driving step of driving the supercharger based on the target rotation speed of the supercharger after the supercharger passage opening step is performed.

11. The boosting control method of claim 1, wherein after the supercharger passage opening step is performed, the CDA operable area confirming step is repeatedly performed.

12. The boosting control method of claim 1, wherein in the supercharger passage opening step, the bypass valve closes an intake passage of the engine and opens the supercharger passage when the target rotation speed of the supercharger derived in the supercharger target rotation speed deriving step is equal to or more than the predetermined reference value previously input to the controller, and wherein the bypass valve opens the intake passage of the engine and closes the supercharger passage when the CDA operable area confirming step determines that the CDA is not in the operable area of the CDA.

* * * * *